United States Patent
Kong et al.

(10) Patent No.: US 9,052,519 B2
(45) Date of Patent: Jun. 9, 2015

(54) IMAGE DISPLAY DEVICE

(75) Inventors: Namyong Kong, Gyeonggi-do (KR); Seonggyun Kim, Gyeonggi-do (KR); Suwoong Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 319 days.

(21) Appl. No.: 13/107,390

(22) Filed: May 13, 2011

(65) Prior Publication Data
US 2011/0279761 A1 Nov. 17, 2011

(30) Foreign Application Priority Data
May 14, 2010 (KR) .................. 10-2010-0045250

(51) Int. Cl.
*G02B 27/26* (2006.01)
*H04N 13/04* (2006.01)
*G09G 3/00* (2006.01)

(52) U.S. Cl.
CPC ............... *G02B 27/26* (2013.01); *G09G 3/003* (2013.01); *G09G 2300/023* (2013.01); *H04N 13/0434* (2013.01)

(58) Field of Classification Search
CPC . G02B 27/26; G09G 3/003; G09G 2300/023; H04N 13/0434
USPC ................ 348/56, 51, 58; 349/117; 345/211; 359/465
See application file for complete search history.

(56) References Cited

U.S. PATENT DOCUMENTS

| 2007/0008406 | A1* | 1/2007 | Shestak et al. | 348/58 |
| 2008/0036853 | A1* | 2/2008 | Shestak et al. | 348/51 |
| 2010/0066820 | A1 | 3/2010 | Park et al. | |
| 2010/0265230 | A1* | 10/2010 | Kang | 345/211 |
| 2010/0302634 | A1* | 12/2010 | Jung | 359/465 |
| 2011/0025833 | A1* | 2/2011 | Baik et al. | 348/58 |
| 2011/0063533 | A1* | 3/2011 | Kim et al. | 349/15 |

FOREIGN PATENT DOCUMENTS

| CN | 1916692 A | 2/2007 |
| CN | 101196649 A | 6/2008 |
| CN | 101356832 A | 1/2009 |
| JP | 2002-185983 | 6/2002 |
| KR | 10-2007-0108045 A | 11/2007 |
| KR | 10-2010-0032284 A | 3/2010 |

OTHER PUBLICATIONS

Office Action from the Korean Patent Office dated Aug. 28, 2012 in a counterpart Korean application.
Office Action dated Aug. 1, 2013 from The State Intellectual Property Office of the People's Republic of China in counterpart Chinese application 201110130931.X.

* cited by examiner

*Primary Examiner* — Dave Czekaj
*Assistant Examiner* — Berteau Joisil
(74) *Attorney, Agent, or Firm* — Morgan, Lewis & Bockius LLP

(57) ABSTRACT

An image display device is discussed. The image display device includes a display panel configured to selectively display a 2D image and a 3D image and a patterned retarder disposed line by line. The patterned retarder includes a first retarder transmitting only a left eye image of the 3D image from the display panel and a second retarder transmitting only a right eye image of the 3D image. Pixels disposed on the display panel alternately display the 3D image and a black image every one horizontal line in an interlace manner through a time division.

13 Claims, 10 Drawing Sheets (a)

(b)

2D Mode

Pixel Pair

IMAGE DISPLAY DEVICE

This application claims the benefit of Korean Patent Application No. 10-2010-0045250 filed on May 14, 2010, which is incorporated herein by reference for all purposes as if fully set forth herein.

BACKGROUND OF THE INVENTION

1. Field of the Invention

Embodiments of the invention relate to an image display device capable of improving the display quality.

2. Discussion of the Related Art

With the development of various image processing techniques, image display devices capable of selectively implementing a two-dimensional (2D) image and a three-dimensional (3D) image have been recently developed.

A stereoscopic technique and an autostereoscopic technique are known as a method for implementing the 3D image in the image display device.

The stereoscopic technique, which uses a parallax image between left and right eyes of a user with a high stereoscopic effect, includes a glasses type method and a non-glasses type method, both of which have been put on the market. The glasses type method includes a polarization glasses type method and a liquid crystal shutter glasses type method. In the glasses type method, the parallax image is displayed on a direct-view display or a projector through a change in a polarization direction of the left and right parallax image, and thus a stereoscopic image is implemented using polarization glasses or liquid crystal shutter glasses.

As shown in FIG. 1, an image display device using the polarization glasses type method includes a patterned retarder 5 for converting polarization characteristics of light incident on polarization glasses 6 on a display panel 3. In the polarization glasses type method, a left eye image L and a right eye image R of 3D image are alternately displayed on the display panel 3, and the polarization characteristics of light incident on the polarization glasses 6 are converted by the patterned retarder 5. Through this operation, the image display device using the polarization glasses type method can implement the 3D image by spatially separating the left eye image L and the right eye image R. In FIG. 1, a reference numeral 1 denotes a backlight unit providing light to the display panel 3, and reference numerals 2 and 4 denote polarizing plates respectively attached to upper and lower surfaces of the display panel 3 so as to select a linear polarization.

In the polarization glasses type method, visibility of the 3D image is reduced due to a crosstalk generated at the position of an upward or downward viewing angle. Hence, in the general polarization glasses type method, the upward/downward viewing angle capable of allowing the user to view the 3D image with the good image quality is very narrow. The crosstalk is generated because the left eye image L passes through a right eye patterned retarder region as well as a left eye patterned retarder region and the right eye image R passes through the left eye patterned retarder region as well as the right eye patterned retarder region at the position of the upward/downward viewing angle.

Thus, as shown in FIG. 2, Japanese Laid Open Publication No. 2002-185983 discloses a method for securing a wider upward/downward viewing angle by forming black stripes BS in a region of a patterned retarder corresponding to black matrixes BM of a display panel to thereby improve visibility of a 3D image. In FIG. 2, when observing the display panel at a predetermined distance D form the display panel, a viewing angle α, at which the crosstalk is not theoretically generated, depends on the size of the black matrixes BM of the display panel, the size of the black stripes BS of the patterned retarder, and a spacer S between the display panel and the patterned retarder. The viewing angle α widens as the size of the black matrixes BM and the size of the black stripes BS increase and as the spacer S between the display panel and the patterned retarder decreases. However, in the related art, the black stripes BS of the patterned retarder used to improve the visibility of the 3D image interact with the black matrixes BM of the display panel, thereby generating moiré. Hence, visibility of a 2D image displayed on the display panel is greatly reduced.

FIG. 3 shows the results of an observation of a 47-inch display device sample at a location 4,000 mm away from a display device to which black stripes are applied. When a 2D image is displayed, moirés of 90 mm, 150 mm, and 355 mm are visible at observation positions A, B, and C, respectively. Further, black stripes used to improve the visibility of a 3D image cause a side effect capable of drastically reducing a luminance of the 2D image. This is because, as shown in FIG. 4(b), in the related art, predetermined portions of pixels of the display panel are covered by black stripe patterns. Accordingly, when the 2D image is displayed, an amount of transmitted light illustrated in FIG. 4(b) is reduced by about 30%, compared with FIG. 4(a) in which the black strips are not formed.

Further, in the related art, because the left eye image and the right eye image of the 3D image are spatially separated and displayed, a vertical resolution of the left or right eye image is reduced to about one half of a natural vertical resolution of the display panel. Accordingly, it is impossible to display a 3D image having a full high-definition (HD) resolution (for example, 1920×1080) on a full HD panel. A reduction in the vertical resolution of the 3D image reduces a definition of the 3D image.

SUMMARY OF THE INVENTION

Embodiments of the invention provide an image display device capable of improving a visibility of a 3D image without reducing a visibility and a luminance of a 2D image.

Embodiments of the invention also provide an image display device capable of preventing a reduction in a vertical resolution when implementing a 3D image.

In one aspect, there is an image display device including a display panel configured to selectively display a 2D image and a 3D image, and a patterned retarder disposed line by line, the patterned retarder including a first retarder transmitting only a left eye image of the 3D image from the display panel and a second retarder transmitting only a right eye image of the 3D image, wherein pixels disposed on the display panel alternately display the 3D image and a black image every one horizontal line in an interlace manner through a time division.

The 3D image is implemented in a pair of frames including an odd-numbered frame and an even-numbered frame.

A vertical pitch of each of the first and second retarders is set to about two times a vertical pitch of the pixel.

Pixels of a horizontal line corresponding to the first retarder display the left eye image and the black image, and pixels of a horizontal line corresponding to the second retarder display the right eye image and the black image.

In the odd-numbered frame, the left eye image is displayed on pixels of (4$n$-3)th horizontal lines, the black image is displayed on pixels of (4$n$-2)th horizontal lines, the right eye image is displayed on pixels of (4$n$-1)th horizontal lines, and the black image is displayed on pixels of (4$n$)th horizontal lines, where n is a positive integer. In the even-numbered frame, the black image is displayed on the pixels of the (4n-3)th horizontal lines, the left eye image is displayed on the pixels of the (4n-2)th horizontal lines, the black image is displayed on the pixels of the (4n-1)th horizontal lines, and the right eye image is displayed on the pixels of the (4n)th horizontal lines.

The vertical pitch of each of the first and second retarders is set to be substantially equal to the vertical pitch of the pixel.

The left eye image and the black image are alternately displayed in the odd-numbered frame. The right eye image and the black image are alternately displayed in the even-numbered frame.

In the odd-numbered frame, the left eye image is displayed on pixels of (2n-1)th horizontal lines corresponding to the first retarder, and the black image is displayed on the pixels of (2n)th horizontal lines corresponding to the second retarder, where n is a positive integer. In the even-numbered frame, the black image is displayed on the pixels of the (2n-1)th horizontal lines corresponding to the first retarder, and the right eye image is displayed on the pixels of the (2n)th horizontal lines corresponding to the second retarder.

The display panel provides an ultra definition (UD) resolution (3840×2160) or a full high-definition (HD)+α resolution (1920×2160), so that a vertical resolution of the display panel is about two times a full HD resolution (1920×1080).

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

Figure 1:
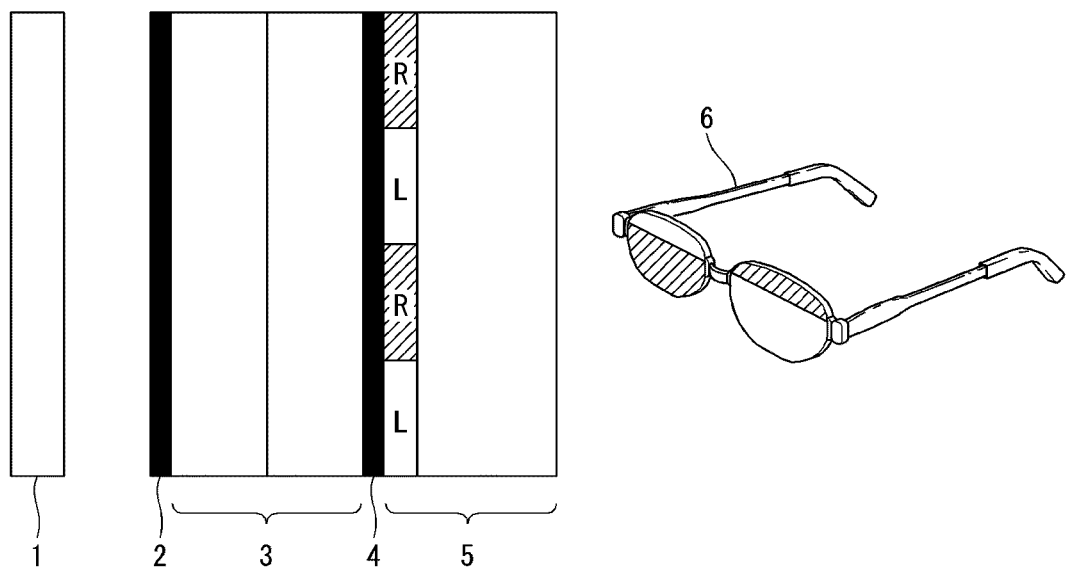
FIG. 1 schematically illustrates a polarization glasses type image display device.
Figure 2:
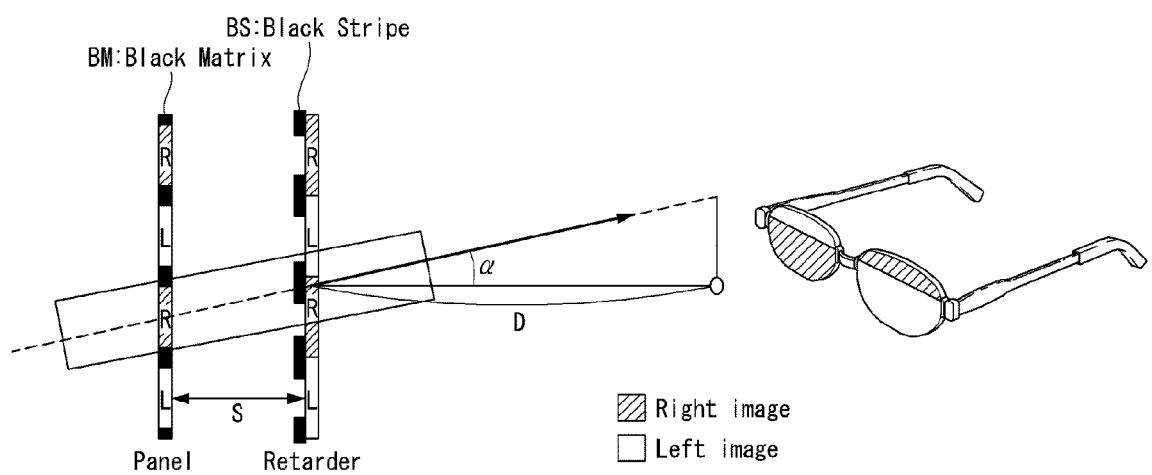
FIG. 2 illustrates an example of forming black stripes in a region of a patterned retarder corresponding to black matrixes of a display panel of a related art image display device.
Figure 3:
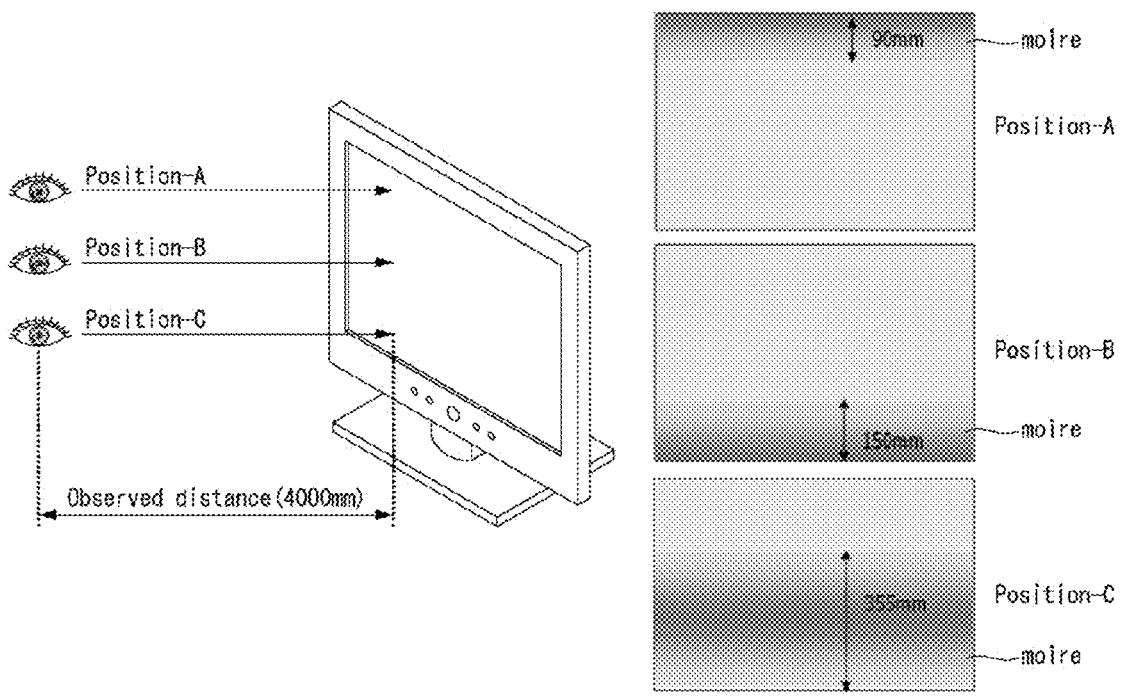
FIG. 3 illustrates moiré generated by black stripe patterns in a related art image display device.
Figure 4:
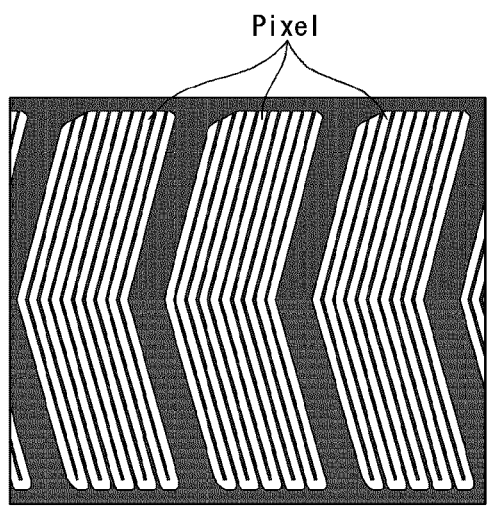
FIG. 4 illustrates a reduction in an amount of transmitted light due to a black strip pattern in a related art image display device.
Figure 4:
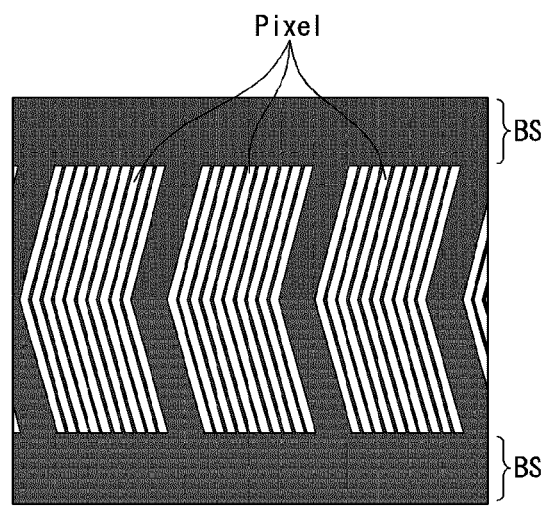
Figure 5:
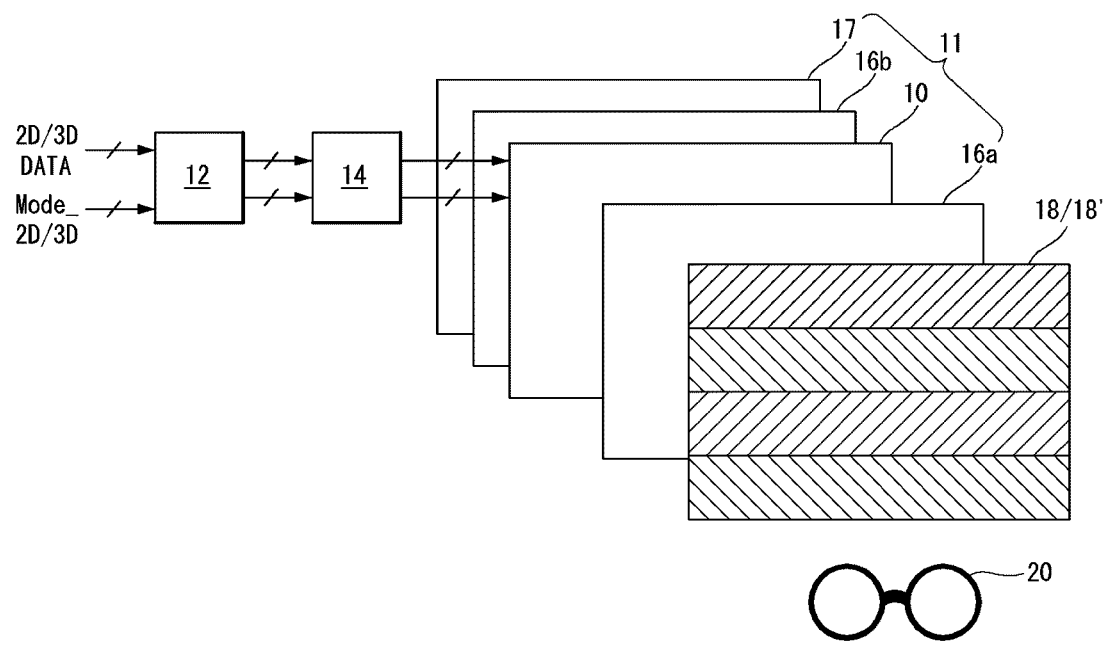
FIG. 5 illustrates an image display device according to an example embodiment of the invention.

FIG. 5 illustrates an image display device according to an example embodiment of the invention.

As shown in FIG. 5, an image display device according to an example embodiment of the invention includes a display element 11, a controller 12, a driving circuit 14, a patterned retarder 18 (or 18'), polarization glasses 20, and the like. The display element 11 may be implemented by a flat panel display such as a liquid crystal display (LCD), a field emission display (FED), a plasma display panel (PDP), an electroluminescence device (EL) including an inorganic electroluminescence element and an organic light emitting diode (OLED) element, and an electrophoretic display (EPD). If the display element 11 is implemented as the liquid crystal display, the display element 11 may further include a display panel 10, a backlight unit 17 positioned under the display panel 10, an upper polarizing film 16a positioned between the display panel 10 and the patterned retarder 18/18', and a lower polarizing film 16b positioned between the display panel 10 and the backlight unit 17. In the following description, the display element 11 is described using the liquid crystal display as an example for the sake of brevity. Other types of display devices may be used. The patterned retarder 18/18' and the polarization glasses 20 serve as a 3D driving element and implement binocular disparity by spatially separating a left eye image and a right eye image.

The display panel 10 includes an upper glass substrate, a lower glass substrate, and a liquid crystal layer interposed between the upper and lower glass substrates. A thin film transistor (TFT) array is formed on the lower glass substrate. The TFT array includes a plurality of data lines to which R (red), G (green), and B (blue) data voltages are supplied, a plurality of gate lines (or scan lines) that cross the data lines and receive a gate pulse (or scan pulse), a plurality of TFTs respectively formed at crossings of the data lines and the gate lines, a plurality of pixel electrodes for charging liquid crystal cells to the data voltages, a storage capacitor that is connected to each pixel electrode and holds the voltage of the liquid crystal cells, and the like. A color filter array is formed on the upper glass substrate. The color filter array includes black matrixes, color filters, and the like. A common electrode is positioned opposite the pixel electrode and forms an electric field along with the pixel electrode. The common electrode is formed on the upper glass substrate in a vertical electric field driving manner such as a twisted nematic (TN) mode and a vertical alignment (VA) mode. The common electrode is formed on the lower glass substrate along with the pixel electrode in a horizontal electric field driving manner such as an in-plane switching (IPS) mode or a fringe field switching (FFS) mode. The upper polarizing film 16a is attached to the upper glass substrate, and the lower polarizing film 16b is attached to the lower glass substrate. Alignment layers for setting a pre-tilt angle of liquid crystals on the inner surfaces contacting the liquid crystals are respectively formed on the upper and lower glass substrates. A column spacer may be formed between the upper and lower glass substrates, thereby uniformly keeping a cell gap of the liquid crystal cells.

In a 2D mode Mode_2D, the display panel 10 displays a 2D image under the control of the controller 12. In a 3D mode Mode_3D, the display panel 10 displays a 3D image under the control of the controller 12. In the 3D mode Mode_3D, the data voltage of a 3D data format and a black gray level voltage are alternately applied to pixels disposed on the display panel 10 every one horizontal line. The black gray level voltage is displayed between the vertically adjacent 3D images and widens a display interval between the vertically adjacent 3D images. As a result, because visibility of the 3D image is improved by sufficiently securing an upward or downward viewing angle in the 3D mode Mode_3D, the embodiment of the invention does not have to include a separate black stripe pattern on the patterned retarder unlike the related art. In the 2D mode Mode_2D, the data voltage of a 2D data format is applied to all of the pixels of the display panel 10. Because the separate black stripe pattern is not formed on the patterned retarder in the embodiment of the invention, moiré is not generated in the 2D mode Mode_2D. As a result, the embodiment of the invention can improve visibility of the 2D image and can prevent a reduction in a luminance of the 2D image when the 2D image is displayed.

The driving circuit 14 includes a data driving circuit for driving the data lines of the display panel 10 and a gate driving circuit for driving the gate lines of the display panel 10.

In the 3D mode Mode_3D, the data driving circuit latches RGB digital video data of the 3D data format under the control of the controller 12 and converts the latched RGB digital video data into the RGB data voltages of the 3D data format using a gamma compensation voltage. Further, the data driving circuit latches digital black data under the control of the controller 12 and converts the latched digital black data into the black gray level voltage using the gamma compensation voltage. The data driving circuit alternately supplies the RGB data voltage of the 3D data format and the black gray level voltage to the data lines of the display panel 10 every one horizontal period under the control of the controller 12.

In the 2D mode Mode_2D, the data driving circuit latches RGB digital video data of the 2D data format under the control of the controller 12 and converts the latched RGB digital video data into RGB data voltage of the 2D data format using the gamma compensation voltage. The data driving circuit then supplies the RGB data voltage of the 2D data format to the data lines of the display panel 10.

The gate driving circuit sequentially supplies the gate pulse to the gate lines of the display panel 10 under the control of the controller 12, thereby selecting the horizontal line of the display panel 10 to which the data voltage is applied.

The controller 12 controls the driving circuit 14 in the 2D mode Mode_2D or the 3D mode Mode_3D in response to a mode selection signal input through a user interface (not shown) or a 2D/3D identification code extracted from an input image signal. In the 3D mode Mode_3D, the controller 12 alternately rearranges the internally produced digital black data and the RGB digital video data of the 3D data format, that is input from the outside, every one horizontal line and supplies the rearranged digital black data and the rearranged RGB digital video data of the 3D data format to the data driving circuit. In the 2D mode Mode_2D, the controller 12 supplies the RGB digital video data of the 2D data format, that is input from the outside, to the data driving circuit.

The controller 12 generates timing control signals for controlling an operation timing of the driving circuit 14 using timing signals such as a vertical sync signal, a horizontal sync signal, a dot clock, and a data enable. The controller 12 may insert an interpolation frame between frames of the input image input at a frame frequency of 60 Hz and may multiply the frequency of the timing control signals by N, thereby controlling an operation of the driving circuit 14 at a frame frequency of (60×N) Hz, where N is a positive integer equal to or greater than 2.

The backlight unit 17 includes a plurality of light sources and provides light to the display panel 10. The backlight unit 17 may be implemented as one of an edge type backlight unit and a direct type backlight unit. In the direct type backlight unit 17, a plurality of optical sheets and a diffusion plate are stacked under the display panel 10, and the plurality of light sources are positioned under the diffusion plate. In the edge type backlight unit 17, a plurality of optical sheets and a light guide plate are stacked under the display panel 10, and the plurality of light sources are positioned at the sides of the light guide plate. The light sources may be implemented as a line light source such as a cold cathode fluorescent lamp (CCFL) and an external electrode fluorescent lamp (EEFL), or may be implemented as a point light source such as a light emitting diode (LED).

Figure 6:
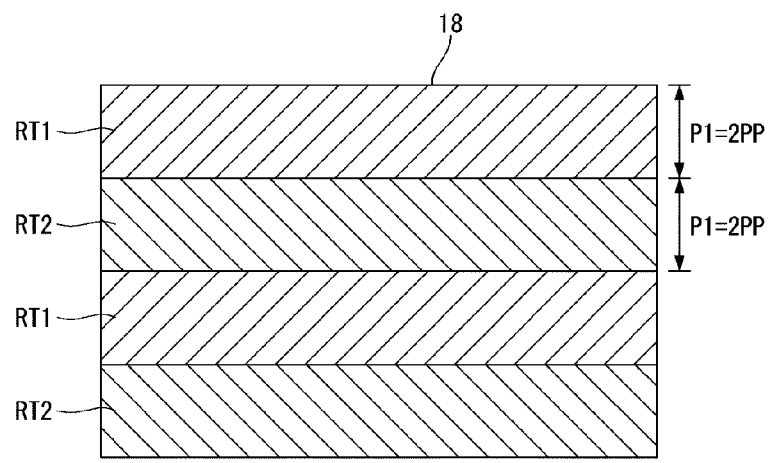
FIG. 6 illustrates a first exemplary configuration of a patterned retarder.
Figure 8:
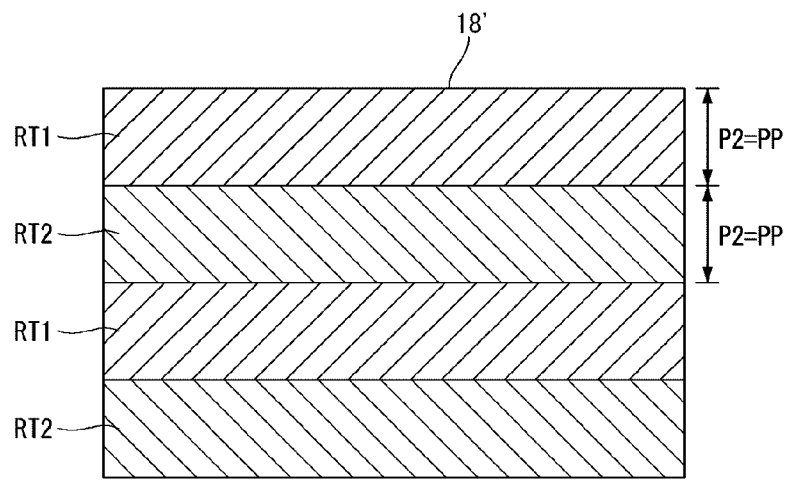
FIG. 8 illustrates a second exemplary configuration of a patterned retarder.

The patterned retarder 18/18' may be patterned on a base using one of a glass substrate, a transparent plastic substrate, and a film as the base. The base with the patterned retarder 18/18' formed thereon is attached to the upper polarizing film 16a using an adhesive. The patterned retarder 18/18' includes first and second retarders and divides the 3D image into polarization components. The first and second retarders have retardation axes, that are perpendicular to each other, and are disposed line by line. The first retarder is formed on odd-numbered lines of the patterned retarder 18/18' and transmits a first polarization (for example, circular polarization or linear polarization) component of light incident through the upper polarizing film 16a. The second retarder is formed on even-numbered lines of the patterned retarder 18/18' and transmits a second polarization (for example, circular polarization or linear polarization) component of light incident through the upper polarizing film 16a. For example, the first retarder may be implemented as a polarization filter transmitting left circularly polarized light (or right circularly polarized light), and the second retarder may be implemented as a polarization filter transmitting right circularly polarized light (or left circularly polarized light). As shown in FIG. 6, a vertical pitch of each of the first and second retarders may be set to about two times a vertical pitch of the pixel. Alternatively, as shown in FIG. 8, a vertical pitch of each of the first and second retarders may be set to be substantially equal to the vertical pitch of the pixel.

The polarization glasses 20 are implemented so that light absorption axes of a left eyeglass and a right eyeglass of the polarization glasses 20 differ from each other. For example, the left eyeglass of the polarization glasses 20 transmits the left circularly polarized light coming from the patterned retarder 18/18' and blocks light of other polarization components. The right eyeglass of the polarization glasses 20 transmits the right circularly polarized light coming from the patterned retarder 18/18' and blocks light of other polarization components. In this case, the left eyeglass of the polarization glasses 20 may include a left circular polarization filter, and the right eyeglass of the polarization glasses 20 may include a right circular polarization filter.

Figure 7:
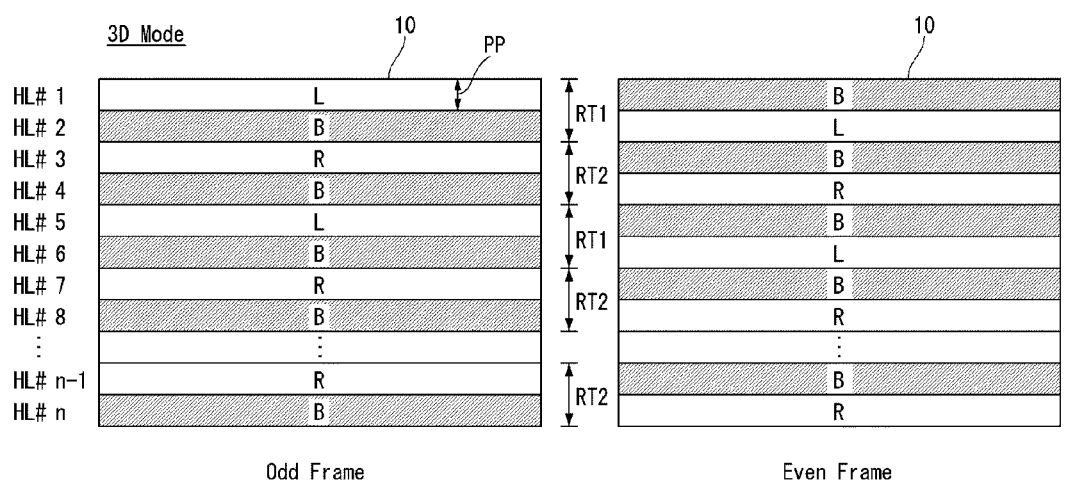
FIG. 7 illustrates an image displayed on a display panel corresponding to FIG. 6.

FIG. 6 illustrates an exemplary configuration of the patterned retarder 18. FIG. 7 illustrates an image displayed on the display panel 10 corresponding to FIG. 6.

As shown in FIGS. 6 and 7, the patterned retarder 18 includes a first retarder RT1 transmitting only a left eye image L coming from the display panel 10 and a second retarder RT2 transmitting only a right eye image R coming from the display panel 10. A vertical pitch P1 of each of the first and second retarders RT1 and RT2 is set to about two times a vertical pitch PP of the pixel.

In the 3D mode for implementing the 3D image, the pixels disposed on the display panel 10 alternately display the left or right eye image L/R and a black image B every one horizontal line. More specifically, the pixels of the horizontal line corresponding to the first retarder RT1 display the left eye image L and the black image B, and the pixels of the horizontal line corresponding to the second retarder RT2 display the right eye image R and the black image B. As a result, the left eye image L and the right eye image R, that are vertically adjacent to each other, are displayed with the black image B interposed therebetween. Because the display interval between the left eye image L and the right eye image R widens because of the black image B, the 3D crosstalk is greatly reduced.

Figure 10:
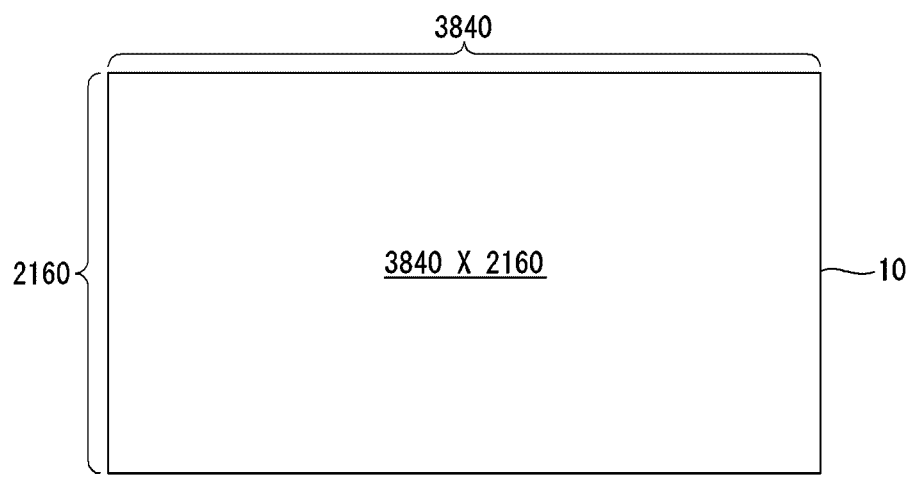
FIGS. 10 and 11 illustrate a resolution of a display panel applied to an example embodiment of the invention.
Figure 11:
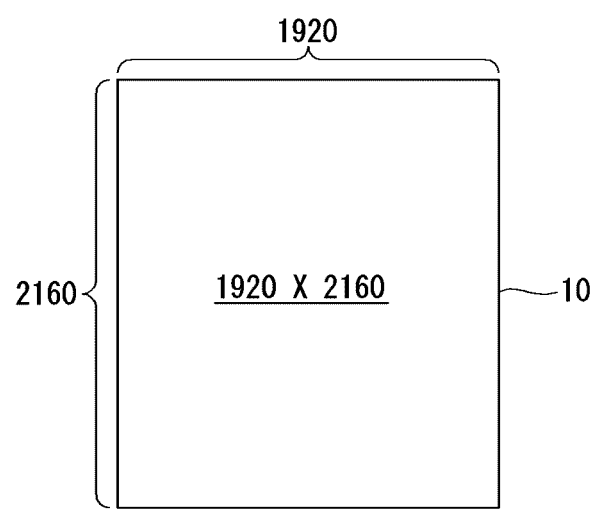

In the embodiment of the invention, one 3D image is implemented in a pair of frames including an odd-numbered frame and an even-numbered frame, that are arranged adjacent to each other, so as to prevent a reduction in a vertical resolution. In this instance, the display panel 10 may provide an ultra definition (UD) resolution (for example, 3840×2160) illustrated in FIG. 10 or a full high-definition (HD)+α resolution (for example, 1920×2160) illustrated in FIG. 11, so that a vertical resolution of the display panel 10 is about two times a full HD resolution (for example, 1920×1080). In the 3D mode for implementing the 3D image, the display panel 10 exchanges display locations of the left eye image L and the black image B corresponding to the first retarder RT1 every one frame period. Further, the display panel 10 exchanges display locations of the right eye image R and the black image B corresponding to the second retarder RT2 every one frame period. More specifically, as shown in FIG. 7, in the odd-numbered frame, the display panel 10 displays the left eye image L on (4n-3)th horizontal lines HL#1, HL#5, . . . , displays the black image B on (4n-2)th horizontal lines HL#2, HL#6, . . . , displays the right eye image R on (4n-1)th horizontal lines HL#3, HL#7, . . . , and displays the black image B on (4n)th horizontal lines HL#4, HL#8, . . . , where n is a positive integer. Further, in the even-numbered frame, the display panel 10 displays the black image B on the (4n-3)th horizontal lines HL#1, HL#5, . . . , displays the left eye image L on the (4n-2)th horizontal lines HL#2, HL#6, . . . , displays the black image B on the (4n-1)th horizontal lines HL#3, HL#7, . . . , and displays the right eye image R on the (4n)th horizontal lines HL#4, HL#8, . . . . As a result, such an interlace display manner may secure the full HD resolution (i.e., 1080) illustrated in FIGS. 10 and 11 as the vertical resolution obtained when the 3D image is implemented.

Figure 12:
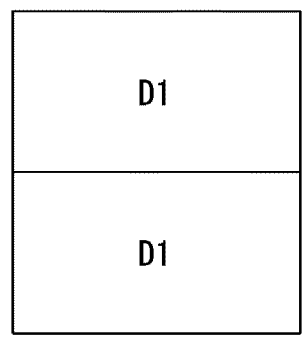
FIG. 12 illustrates an example of displaying a 2D image on the display panel illustrated in FIG. 11.

In the 2D mode for implementing the 2D image, the 2D image is displayed on all of the pixels of the display panel 10, and the patterned retarder 18 transmits light incident through the upper polarizing film 16a without dividing the light into the polarization. When the display panel 10 provides the UD resolution illustrated in FIG. 10, a resolution of the 2D image is 3840×2160. Further, as shown in FIG. 12, when the display panel 10 provides the full HD+α resolution illustrated in FIG. 11, the same 2D image D1 may be displayed on a pair of pixels, that are vertically adjacent to each other, so that the resolution of the 2D image is the full HD resolution (for example, 1920×1080).

Figure 9:
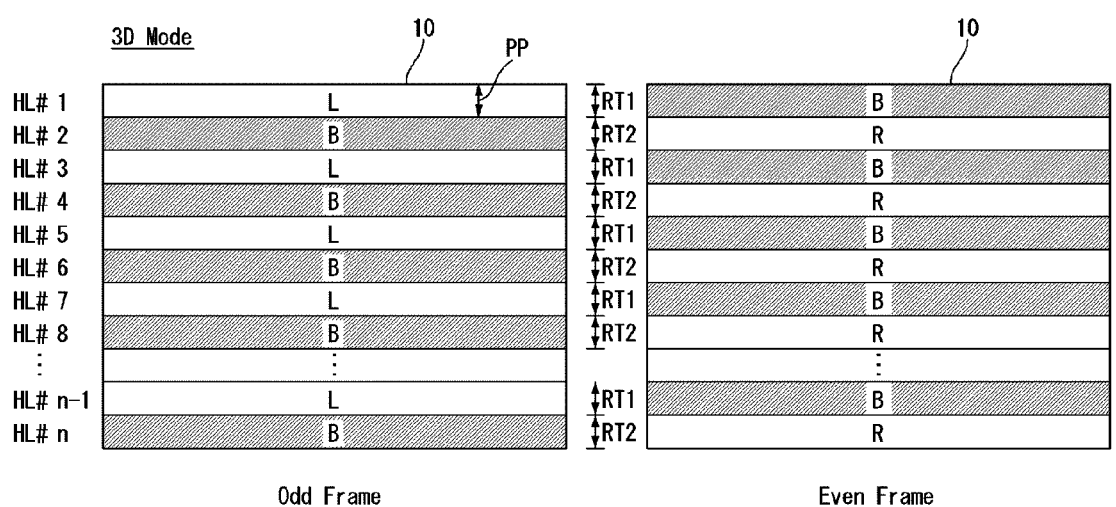
FIG. 9 illustrates an image displayed on a display panel corresponding to FIG. 8.

FIG. 8 illustrates an exemplary configuration of the patterned retarder 18'. FIG. 9 illustrates an image displayed on the display panel 10 corresponding to FIG. 8.

As shown in FIGS. 8 and 9, the patterned retarder 18' includes a first retarder RT1 transmitting only a left eye image L coming from the display panel 10 and a second retarder RT2 transmitting only a right eye image R coming from the display panel 10. A vertical pitch P2 of each of the first and second retarders RT1 and RT2 is set to be substantially equal to a vertical pitch PP of the pixel.

In the embodiment of the invention, one 3D image is implemented in a pair of frames including an odd-numbered frame and an even-numbered frame, that are arranged adjacent to each other, so as to reduce the 3D crosstalk and prevent the reduction in the vertical resolution. The display panel 10 may provide the UD resolution (for example, 3840×2160) illustrated in FIG. 10 or the full HD+α resolution (for example, 1920×2160) illustrated in FIG. 11, so that the vertical resolution of the display panel 10 is about two times the full HD resolution (for example, 1920×1080).

In the 3D mode for implementing the 3D image, the pixels disposed on the display panel 10 alternately display the left eye image L (or the right eye image R) and the black image B every one horizontal line. In this instance, the left eye image L is displayed in only the odd-numbered frames, and the right eye image R is displayed in only the even-numbered frames. More specifically, as shown in FIG. 9, in the odd-numbered frame, the display panel 10 displays the left eye image L on (2n-1)th horizontal lines HL#1, HL#3, HL#5, . . . corresponding to the first retarder RT1 and displays the black image B on (2n)th horizontal lines HL#2, HL#4, HL#6, . . . corresponding to the second retarder RT2. Further, in the even-numbered frame, the display panel 10 displays the black image B on the (2n-1)th horizontal lines HL#1, HL#3, HL#5, . . . corresponding to the first retarder RT1 and displays the right eye image R on the (2n)th horizontal lines HL#2, HL#4, HL#6, . . . corresponding to the second retarder RT2. Because the display interval between the left eye images L (or the right eye images R), that are vertically adjacent to each other, widens because of the black image B, the 3D crosstalk is greatly reduced. Further, the interlace display manner may secure the full HD resolution (i.e., 1080) illustrated in FIGS. 10 and 11 as the vertical resolution obtained when the 3D image is implemented.

In the 2D mode for implementing the 2D image, the 2D image is displayed on all of the pixels of the display panel 10, and the patterned retarder 18' transmits light incident through the upper polarizing film 16a without dividing the light into the polarization. When the display panel 10 provides the UD resolution illustrated in FIG. 10, a resolution of the 2D image is 3840×2160. Further, as shown in FIG. 12, when the display panel 10 provides the full HD+α resolution illustrated in FIG. 11, the same 2D image D1 may be displayed on a pair of pixels, that are vertically adjacent to each other, so that the resolution of the 2D image is the full HD resolution (for example, 1920×1080).

Figure 13:
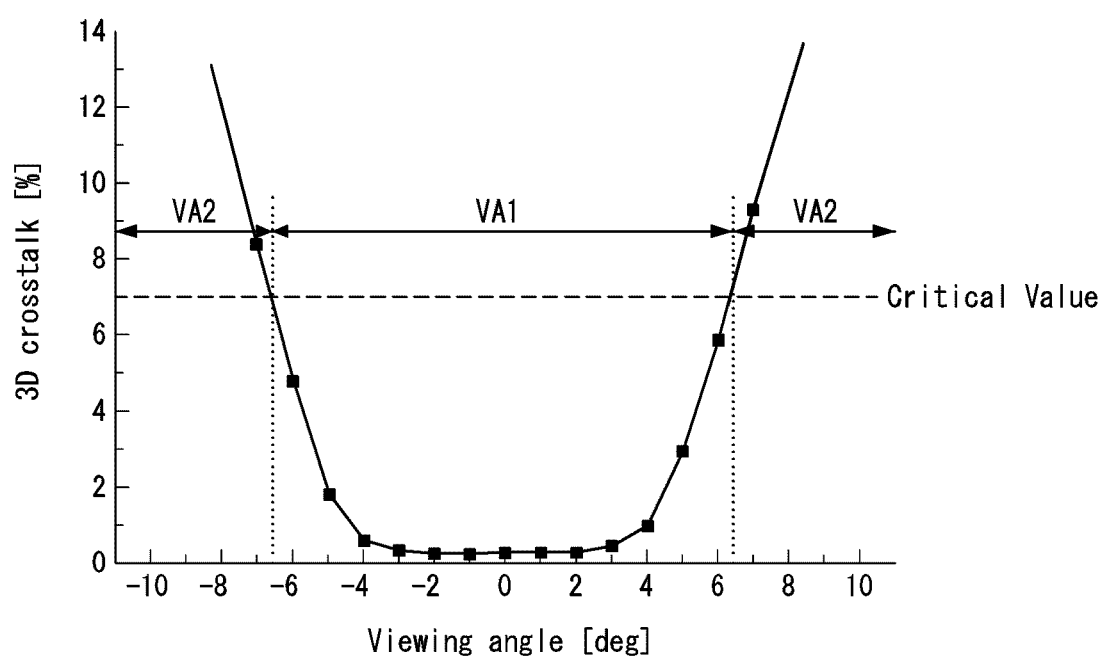
FIG. 13 is a graph illustrating a crosstalk value of a 3D image based on a 3D viewing angle.

FIG. 13 is a graph illustrating a crosstalk value of the 3D image based on the 3D viewing angle. In FIG. 13, a horizontal axis indicates an upward (+)/downward (−) viewing angle (unit: degree) of the 3D image, and a vertical axis indicates a 3D crosstalk value (unit: %).

In the structure of the image display device including the patterned retarder 18/18', as mentioned above, the 3D image with good image quality may be implemented by transmitting only the left eye image using the first retarder and transmitting only the right eye image using the second retarder. However, when observing the image display device not at the front side but at a location of the upward/downward viewing angle, the left eye image may pass through the second retarder as well as the first retarder and the right eye image may pass through the first retarder as well as the second retarder. Hence, a 3D crosstalk C/T is generated. The generated 3D crosstalk C/T may be represented by the flowing Equation 1:

$$C/T[\%] = \frac{L_{Black}R_{White} - \text{Black}}{L_{White}R_{Black} - \text{Black}} \times 100 \qquad \text{[Equation 1]}$$

In Equation 1, '$L_{Black}R_{White}$' is a luminance value of a pattern displaying a black image on left eye pixels and a white image on right eye pixels, '$L_{White}R_{Black}$' is a luminance value of a pattern displaying the white image on the left eye pixels and the black image on the right eye pixels, and 'Black' is a luminance value measured after the black image is displayed on all the pixels. In general, a viewing angle obtained when the 3D crosstalk value C/T calculated by Equation 1 is equal to or less than about 7% is defined as the 3D viewing angle capable of obtaining the 3D image with the good image quality. As a result, the 3D crosstalk value C/T of about 7% is a critical value for determining the 3D viewing angle capable of obtaining the good 3D image. The critical value of about 7% may vary depending on models of the image display device.

As indicated by the graph of FIG. 13, the user may view the 3D image of the good image quality within a viewing angle range VA1 in which the 3D crosstalk value is equal to or less than a predetermined critical value (for example, about 7%). On the other hand, the user may not view the 3D image of the good image quality within a viewing angle range VA2, in which the 3D crosstalk value is greater than the predetermined critical value, because of an overlap of the left and right eye images.

Figure 14:
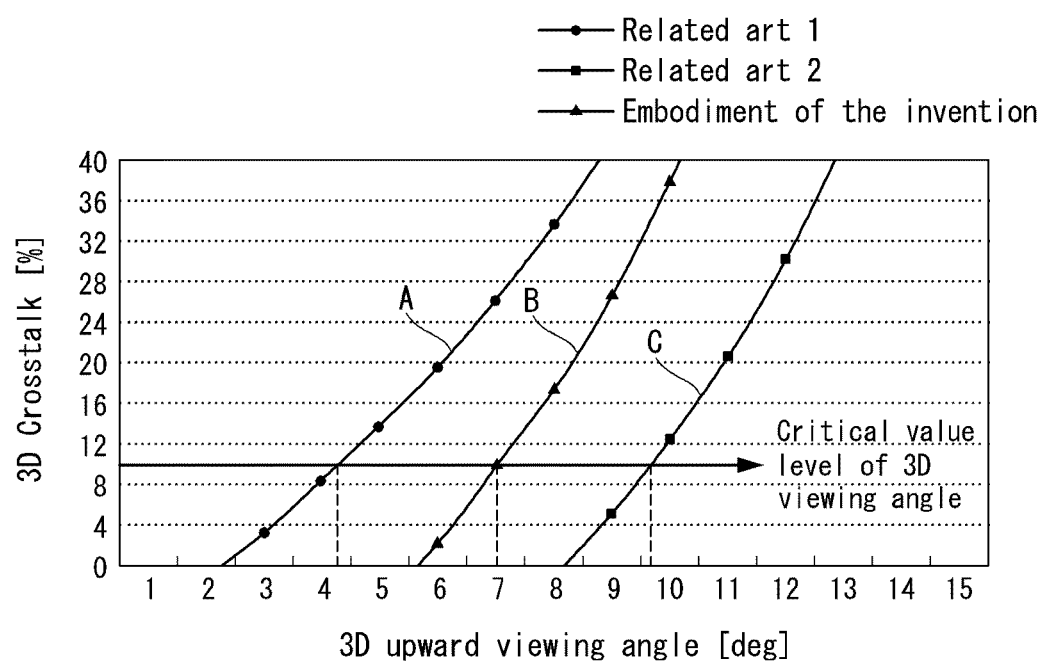
FIG. 14 is a graph illustrating a comparison between an upward viewing angle of a 3D image according to an example embodiment of the invention and an upward viewing angle of a 3D image in the related arts.

FIG. 14 is a graph illustrating a comparison between an upward viewing angle of the 3D image according to the embodiment of the invention and an upward viewing angle of a 3D image in the related arts. In FIG. 14, a horizontal axis indicates the upward viewing angle (unit: degree) of the 3D image, and a vertical axis indicates a crosstalk value (unit: %) of the 3D image.

In FIG. 14, a graph 'A' indicates an upward viewing angle of the related art 1 in which left and right eye images have a display interval of about 80 μm by black matrixes and a patterned retarder does not have black stripes. According to the graph 'A' illustrating the related art 1, the upward viewing angle satisfying the critical value (for example, about 7%) of the 3D crosstalk is about 0° to 4° and is very narrow. A graph 'C' indicates an upward viewing angle of the related art 2 in which left and right eye images have a display interval of about 80 μm by black matrixes and a patterned retarder have black stripe patterns with a width of about 210 μm. According to the graph 'C' illustrating the related art 2, the upward viewing angle satisfying the critical value (for example, about 7%) of the 3D crosstalk is about 0° to 10° and relatively widens. However, in the related art 2, the visibility and the luminance of the 2D image are greatly reduced because of the presence of the black stripe patterns for securing the viewing angle.

On the other hand, in the embodiment of the invention, the display interval between the left eye image and the right eye image of the 3D image can be sufficiently secured without a separate black stripe pattern. Thus, as indicated by a graph 'B' of FIG. 14, the upward viewing angle satisfying the critical value (for example, about 7%) of the 3D crosstalk may increase to about 0° to 7° without reducing the visibility and the luminance of the 2D image.

As described above, the image display device according to the embodiment of the invention may display the black image between the left eye image and the right eye image only when the 3D image is implemented, thereby efficiently removing the 3D crosstalk without reducing the visibility and the luminance of the 2D image and greatly improving the visibility of the 3D image.

Furthermore, the image display device according to the embodiment of the invention may display the 3D image using the UD resolution panel in the interlace manner through the time division, thereby securing the full HD resolution as the vertical resolution of the 3D image when the 3D image is implemented.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
a display panel configured to selectively display a 2D image and a 3D image through pixels disposed thereon; and
a patterned retarder including a first retarder transmitting only a left eye image of the 3D image from the display panel and a second retarder transmitting only a right eye image of the 3D image which are disposed alternatively along a vertical direction,
wherein pixels in every one horizontal line display the 3D image in a frame and display a black image in a next frame, and
wherein in every odd-numbered frame and every even-numbered frame, a first pair of a line displaying the left eye image and a line displaying the black image and a second pair of a line displaying the right eye image and a line displaying the black image are alternatively disposed in a vertical direction.

2. An image display device comprising:
a display panel configured to selectively display a 2D image and a 3D image through pixels disposed thereon; and
a patterned retarder including a first retarder transmitting only a left eye image of the 3D image from the display panel and a second retarder transmitting only a right eye image of the 3D image which are disposed alternatively along a vertical direction,
wherein pixels in every one horizontal line display the 3D image in a frame and display a black image in a next frame, and
wherein odd-numbered frames display only one out of first pairs of a line displaying the left eye image and a line displaying the black image and second pairs of a line displaying the right eye image and a line displaying the black image and even-numbered frames displays only the other out of the first pairs and the second pairs.

3. The image display device of claim 1, wherein a vertical pitch of each of the first and second retarders is set to about two times a vertical pitch of the pixel.

4. The image display device of claim 3, wherein one out of the first pair and the second pair corresponds to the first retarder, and the other out of the first pair and the second pair corresponds to the second retarder.

5. The image display device of claim 4, wherein in the odd-numbered frame, the left eye image is displayed on pixels of (4n-3)th horizontal lines, the black image is displayed on pixels of (4n-2)th horizontal lines, the right eye image is displayed on pixels of (4n-1)th horizontal lines, and the black image is displayed on pixels of (4n)th horizontal lines, where n is a positive integer, wherein in the even-numbered frame, the black image is displayed on the pixels of the (4n-3)th horizontal lines, the left eye image is displayed on the pixels of the (4n-2)th horizontal lines, the black image is displayed on the pixels of the (4n-1)th horizontal lines, and the right eye image is displayed on the pixels of the (4n)th horizontal lines.

6. The image display device of claim 2, wherein a vertical pitch of each of the first and second retarders is set to be substantially equal to a vertical pitch of the pixel.

7. The image display device of claim 6, wherein in the odd-numbered frame, the left eye image is displayed on pixels of (2n-1)th horizontal lines corresponding to the first retarder, and the black image is displayed on the pixels of (2n)th horizontal lines corresponding to the second retarder, where n is a positive integer, wherein in the even-numbered frame, the black image is displayed on the pixels of the (2n-1)th horizontal lines corresponding to the first retarder, and the right eye image is displayed on the pixels of the (2n)th horizontal lines corresponding to the second retarder.

8. The image display device of claim 1, wherein the display panel provides an ultra definition (UD) resolution (3840× 2160), so that a vertical resolution of the display panel is about two times a full high-definition (HD) resolution (1920× 1080).

9. The image display device of claim 1, wherein the display panel provides a full high-definition (HD)+a resolution (1920×2160), so that a vertical resolution of the display panel is about two times a full HD resolution (1920×1080).

10. An image display device comprising:
a display panel configured to selectively display a 2D image and a 3D image using a plurality of pixels on the display panel; and
a patterned retarder including a first retarder transmitting only a left eye image of the 3D image from the display panel and a second retarder transmitting only a right eye image of the 3D image,
wherein pixels disposed in a first horizontal line display data of the 3D image during a first frame and are black during a next frame, and
wherein pixels disposed in a second horizontal line are black during the first frame and display data of the 3D image during the next frame, the second horizontal line being directly below the first horizontal line.

11. The image display device of claim 10, wherein pixels disposed in a third horizontal line display data of the 3D image during the first frame and are black during the next frame, the third horizontal line being directly below the second horizontal line, and
wherein pixels disposed in a fourth horizontal line are black during the first frame and display data of the 3D image during the next frame, the fourth horizontal line being directly below the third horizontal line.

12. The image display device of claim 11, wherein, in the first frame, the pixels of the first horizontal line display data of the left eye image and the pixels of the third horizontal line display data of the right eye image, and
wherein, in the second frame, the pixels of the second horizontal line display data of the left eye image and the pixels of the fourth horizontal line display data of the right eye image.

13. The image display device of claim 11, wherein, in the first frame, the pixels of the first and third horizontal lines display data of the left eye image, and
wherein, in the second frame, the pixels of the second and fourth horizontal lines display data of the right eye image.

* * * * *